United States Patent
Jimenez et al.

(10) Patent No.: US 9,062,751 B2
(45) Date of Patent: Jun. 23, 2015

(54) RIVET FOR USE WITH ANGLED FIXTURE AND METHOD THEREOF

(75) Inventors: Alfredo Jimenez, Wooster, OH (US); Kunding Wang, Copley, OH (US); Patrick M. Lindemann, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 873 days.

(21) Appl. No.: 13/238,194

(22) Filed: Sep. 21, 2011

(65) Prior Publication Data

US 2012/0073279 A1    Mar. 29, 2012

Related U.S. Application Data

(60) Provisional application No. 61/385,668, filed on Sep. 23, 2010.

(51) Int. Cl.
| | |
|---|---|
| *F16H 41/28* | (2006.01) |
| *B21J 15/02* | (2006.01) |
| *B21J 15/14* | (2006.01) |
| *F16H 45/00* | (2006.01) |
| *F16H 45/02* | (2006.01) |

(52) U.S. Cl.
CPC .............. *F16H 41/28* (2013.01); *Y10T 29/4933* (2015.01); *B21J 15/02* (2013.01); *B21J 15/14* (2013.01); *F16H 2045/007* (2013.01); *F16H 2045/0205* (2013.01); *F16H 2045/0294* (2013.01)

(58) Field of Classification Search
CPC ...................................................... F16H 41/28
USPC .................................. 60/341, 346; 29/525.06
See application file for complete search history.

(56) References Cited

U.S. PATENT DOCUMENTS

| | | | | |
|---|---|---|---|---|
| 1,966,401 | A | | 7/1934 | Andren |
| 2,218,805 | A | * | 10/1940 | Becker .......................... 72/482.4 |
| 2,312,457 | A | * | 3/1943 | Weaver .......................... 72/466.5 |
| 3,173,281 | A | * | 3/1965 | Bodmer ............................. 72/67 |
| 4,086,839 | A | * | 5/1978 | Briles ............................ 411/507 |
| 4,437,551 | A | * | 3/1984 | Gimmler et al. .............. 192/3.28 |
| 4,556,133 | A | * | 12/1985 | Huber .......................... 192/70.16 |
| 4,567,974 | A | * | 2/1986 | Birk ............................. 192/70.18 |
| 4,630,463 | A | | 12/1986 | Knowlton |
| 4,681,499 | A | | 7/1987 | Sparling et al. |
| 5,314,048 | A | * | 5/1994 | Bojas et al. ................... 192/3.29 |
| 5,687,825 | A | * | 11/1997 | Villata et al. ................ 192/89.23 |
| 6,193,036 | B1 | * | 2/2001 | Arhab et al. .................. 192/3.29 |

(Continued)

FOREIGN PATENT DOCUMENTS

WO          0136845          5/2001

*Primary Examiner* — F. Daniel Lopez
*Assistant Examiner* — Michael Quandt
(74) *Attorney, Agent, or Firm* — Simpson & Simpson, PLLC

(57) ABSTRACT

A method of connecting plates in a torque converter including: forming a head of a rivet with an end surface that is curved or forms multiple planes; forming a portion of an interior surface of the cover to protrude or indent with respect to a surrounding portion of the interior surface; disposing the body of the rivet in respective holes in respective portions of the plates; and displacing the plates such that the end surface of the rivet head contacts the portion of the interior surface, the respective portions of the first and second plates are at an acute angle with respect to the surrounding portion of the interior surface, and a longitudinal axis of the rivet is at an acute angle with respect to a line orthogonal to the surrounding portion of the interior surface.

11 Claims, 9 Drawing Sheets

(56) References Cited

U.S. PATENT DOCUMENTS

| | | | |
|---|---|---|---|
| 6,293,380 B1 * | 9/2001 | Arhab | 192/3.29 |
| 6,332,516 B1 * | 12/2001 | Arhab | 192/3.29 |
| 6,666,314 B2 * | 12/2003 | Kleifges | 192/70.18 |
| 8,016,091 B2 * | 9/2011 | Heck et al. | 192/3.29 |
| 8,151,957 B2 * | 4/2012 | Hoffmann et al. | 192/3.3 |
| 8,677,598 B2 * | 3/2014 | Lindemann et al. | 29/524.1 |
| 2001/0011621 A1 * | 8/2001 | Bauer et al. | 192/3.29 |
| 2011/0088992 A1 | 4/2011 | Lindemann et al. | |

\* cited by examiner

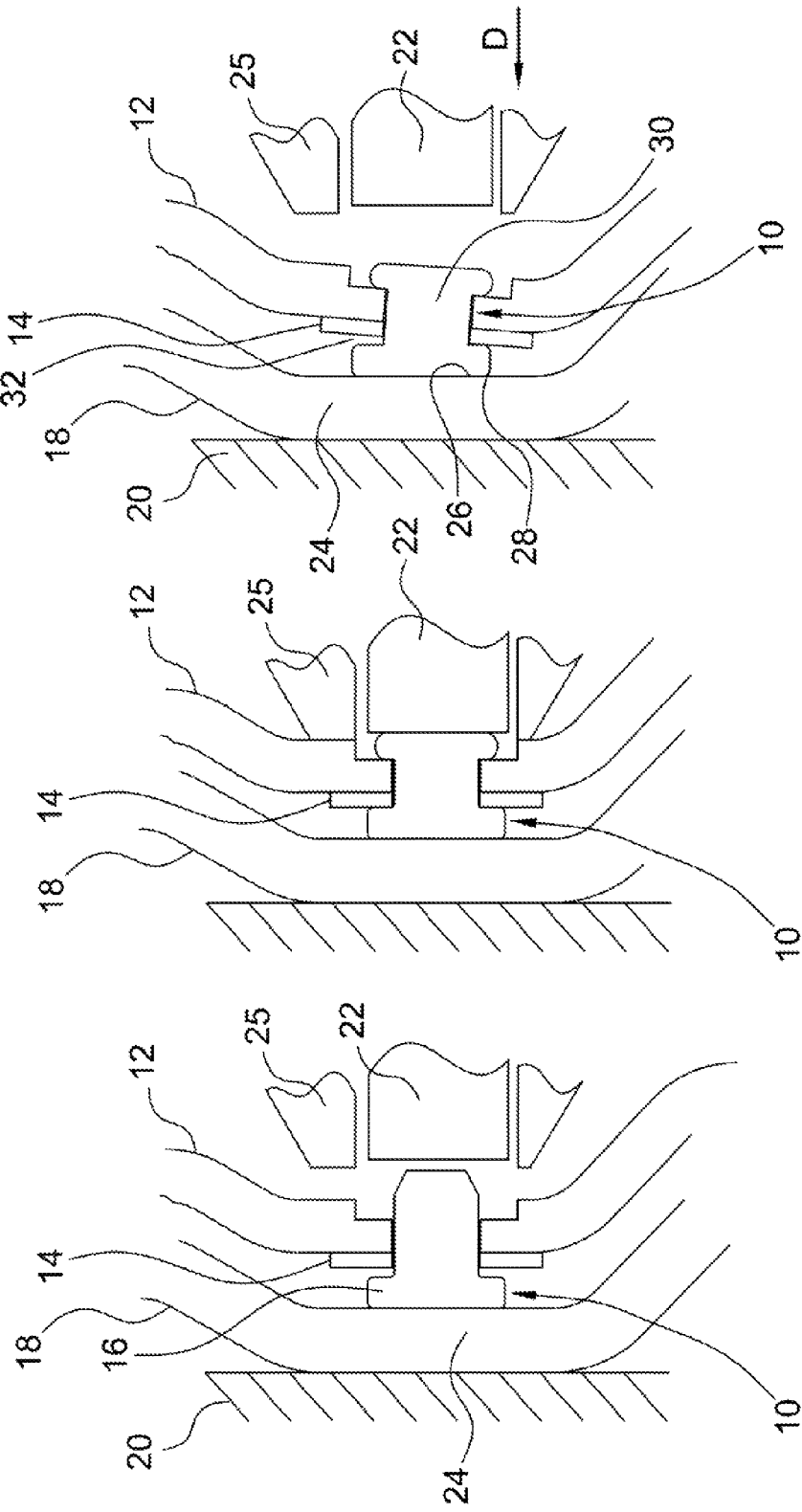

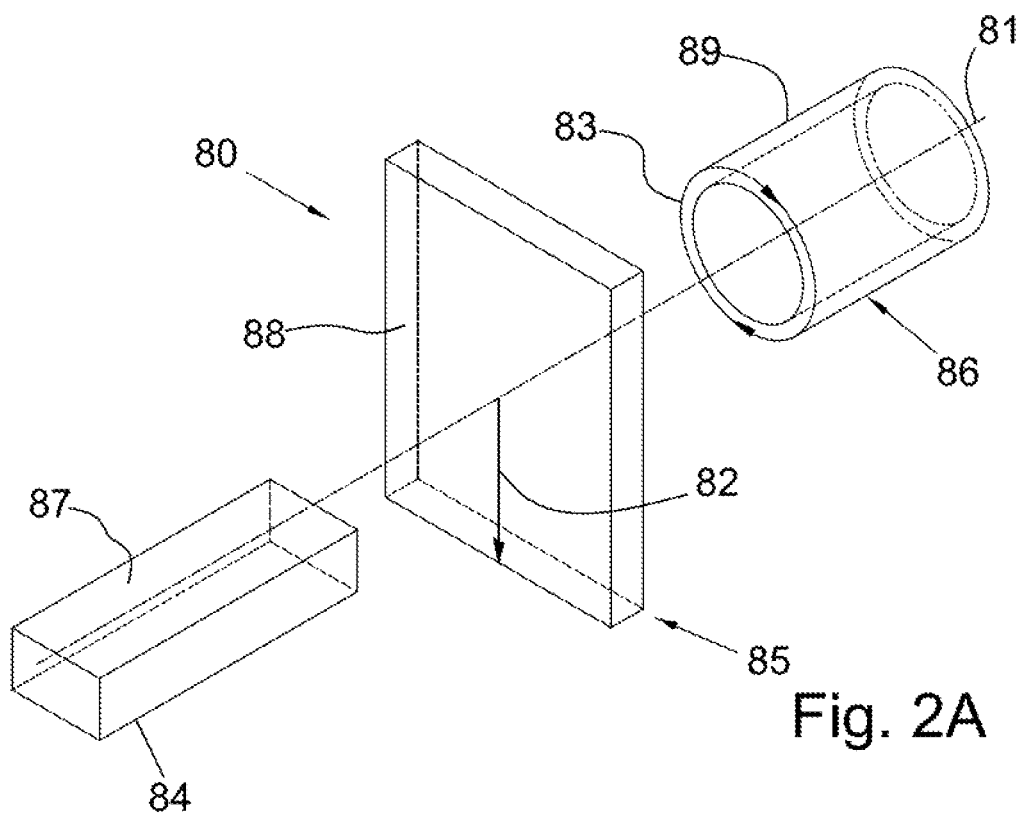
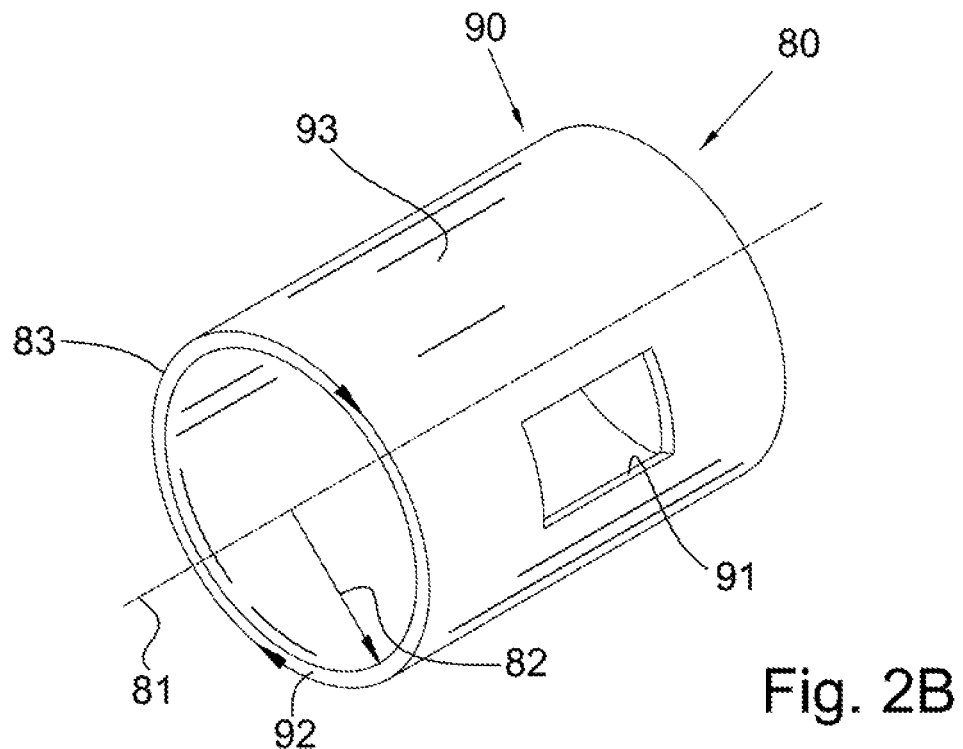

RIVET FOR USE WITH ANGLED FIXTURE AND METHOD THEREOF

CROSS-REFERENCE TO RELATED APPLICATIONS

This application claims the benefit under 35 U.S.C. §119 (e) of U.S. Provisional Application No. 61/385,668 filed on Sep. 23, 2010 which application is incorporated herein by reference.

FIELD OF THE INVENTION

The invention relates to an assembly for a torque converter in which non-parallel plates are blind riveted using rivets with shaped heads and/or a cover with surface features on an interior surface. The invention also relates to a method of riveting plates in a torque converter that are in a non-parallel orientation with respect to a surface against which rivets are to be compressed.

BACKGROUND OF THE INVENTION

FIGS. 1A and 1B illustrates a known method of connecting a piston plate in a torque converter. In FIG. 1A, rivet 10 has been inserted in plate 12 and element 14, and head 16 of the rivet is in contact with cover 18. The cover rests on base 20 and fixture 22 is positioned to apply pressure to the rivet. Plate 12 is substantially parallel to portion 24 of the cover. In FIG. 1B, die 25 has pushed on plate 12 and element 14 to that the plate and element are pressed together against the rivet head. The fixture then applies pressure to the rivet to coin the rivet head. Plate 12 is still substantially parallel to portion 24 of the cover.

FIG. 1C illustrates blind riveting as disclosed in commonly owned U.S. Patent Application No. 61/253,181, filed Oct. 20, 2009. Plate 12 and element 14 have been displaced so that the rivet is in contact with the cover, but the plate and the element are no longer parallel to portion 24 and the rivet is no longer orthogonal to portion 24. Surface 26 of the rivet head does not align with portion 24; therefore, only portion 28 of the end surface is in contact with portion 24. As die 25 displaces to engage plate 12, the upper portion of the die will engage the plate before the lower portion does so, generating an uneven force on the plate. The fixture applies force to the rivet in direction D. Due to the gap between portion 24 and surface 26, the rivet pivots so that portion 24 aligns with surface 26, creating gap 32. Due to the preceding alignment, force is unevenly applied to the rivet head and uneven spreading of the rivet head, improper fill by body 30 of the rivet, damage to the rivet head, damage to the plate or element, or a change in the angle for the plate or element can occur, resulting is a less robust connection and possible leakage around the rivet.

BRIEF SUMMARY OF THE INVENTION

According to aspects illustrated herein, there is provided a method of connecting plates in a torque converter with a rivet, the torque converter including a front cover and first and second plates and the rivet including a body, a head, and a longitudinal axis passing through the body and the head, including: forming the head of the rivet such that an end surface of the head is curved or forms multiple planes; forming a portion of an interior surface of the cover to protrude or indent with respect to a surrounding portion of the interior surface; disposing the body of the rivet in respective holes in respective portions of the first and second plates such that the end surface of the rivet head faces the front cover; and displacing the first and second plates such that the end surface of the rivet head contacts the portion of the interior surface, the respective portions of the first and second plates are at an acute angle with respect to the surrounding portion of the interior surface, and the longitudinal axis of the rivet is at an acute angle with respect to a line orthogonal to the surrounding portion of the interior surface.

According to aspects illustrated herein, there is provided a method of connecting plates in a torque converter with a rivet, the torque converter including a front cover and first and second plates and the rivet including a body, a head, and a longitudinal axis passing through the body and the head, including: protruding a planar surface from a surrounding portion of an interior surface of the cover; disposing the body of the rivet in respective holes in respective portions of the first and second plates such that the end surface of the rivet head faces the front cover; and bending the first and second plates such that the end surface of the rivet head contacts the planar surface, the respective portions of the first and second plates are at an acute angle with respect to the surrounding portion of the interior surface, and the longitudinal axis of the rivet is orthogonal to the planar surface.

According to aspects illustrated herein, there is provided an assembly for a torque converter including: a cover for driving engagement with a prime mover, the cover including an interior surface with a portion protruding or indenting with respect to a surrounding portion of the interior surface; first and second plates including respective portions with respective holes; and a rivet including a body, a head, and a longitudinal axis passing through the body and the head. The body is disposed in the respective holes, and the first and second plates are deflectable to enable contact between the portion of the interior surface and the rivet head as pressure is applied to compress the rivet against the portion of the interior surface to fix the rivet to the first and second plates. As the rivet is compressed the first and second plates are at an acute angle with respect to the surrounding portion of the interior surface, and the longitudinal axis of the rivet is at an acute angle with respect to a line orthogonal to the surrounding portion of the interior surface.

According to aspects illustrated herein, there is provided an assembly for a torque converter including: a cover for driving engagement with a prime mover, the cover including a planar surface protruding from a surrounding portion of the interior surface; first and second plates including respective portions with respective holes; and a rivet including a body, a head, and a longitudinal axis passing through the body and the head. The body is disposed in the respective holes, and the first and second plates are deflectable to enable contact between the planar surface and the rivet head as pressure is applied to compress the rivet against the planar surface to fix the rivet to the first and second plates.

These and other objects and advantages of the present disclosure will be readily appreciable from the following descriptions and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIGS. 1A through 1C illustrates a known method of connecting a piston plate in a torque converter using blind riveting;

FIG. 2A is a perspective view of a cylindrical coordinate system demonstrating spatial terminology used in the present application;

FIG. 2B is a perspective view of an object in the cylindrical coordinate system of FIG. 2A demonstrating spatial terminology used in the present application;

DETAILED DESCRIPTION OF THE INVENTION

Figure 3A:
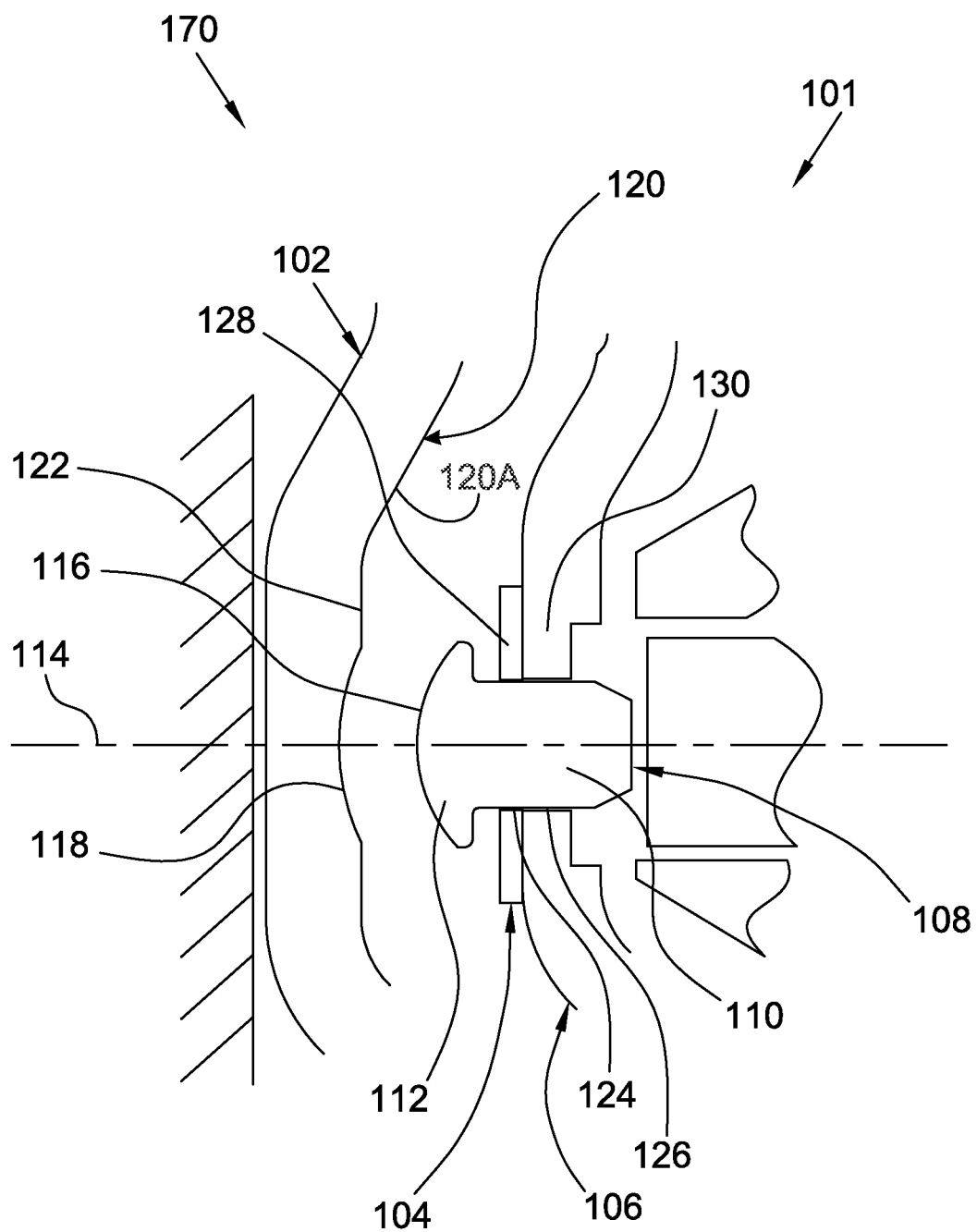
FIGS. 3A through 3C illustrate a method of connecting plates in a torque converter with a shaped rivet head and a shaped surface of a cover plate.

At the outset, it should be appreciated that like drawing numbers on different drawing views identify identical, or functionally similar, structural elements of the invention. It is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

FIG. 2A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

FIG. 2B is a perspective view of object 90 in cylindrical coordinate system 80 of FIG. 2A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 3B:
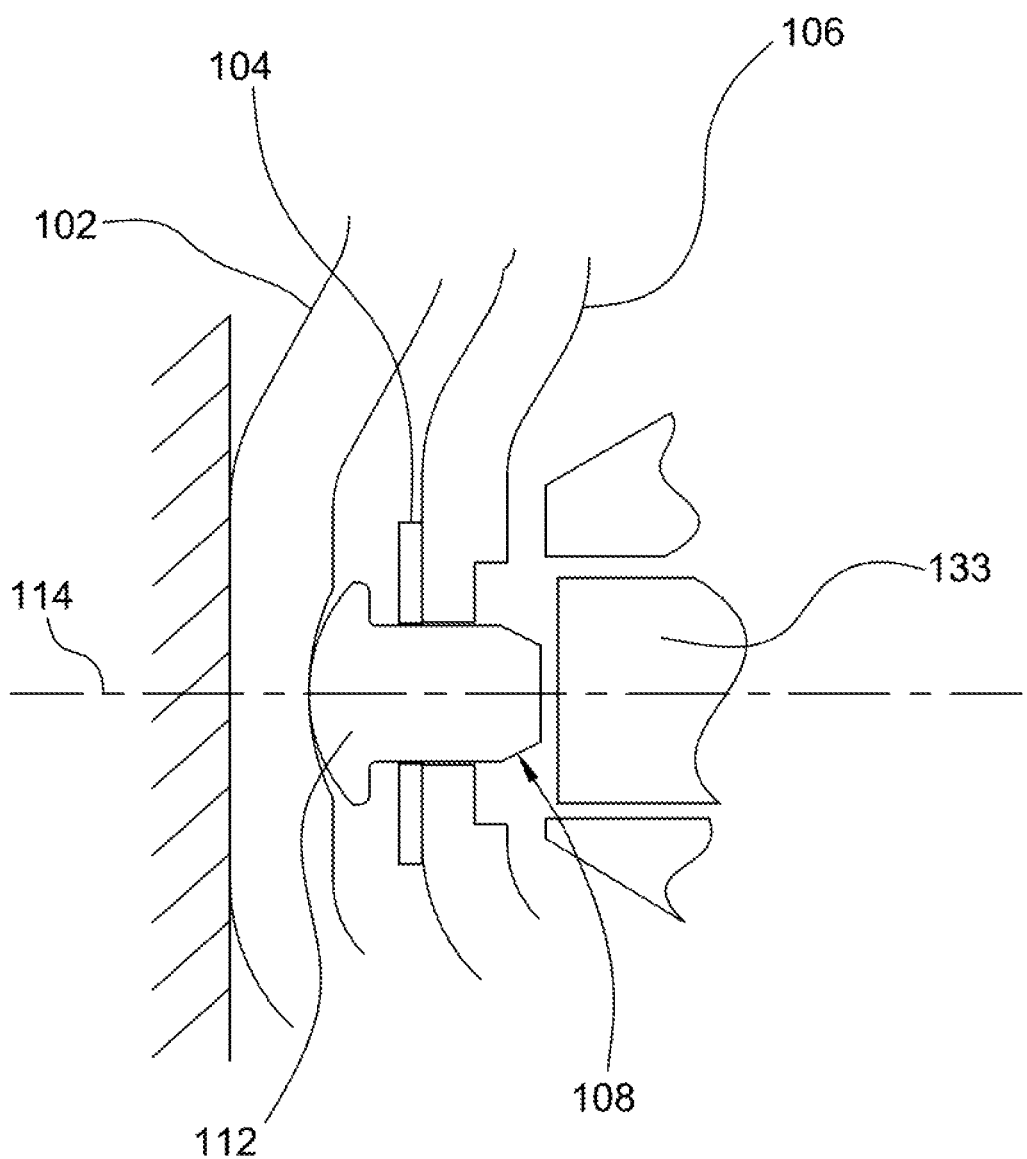
Figure 3C:
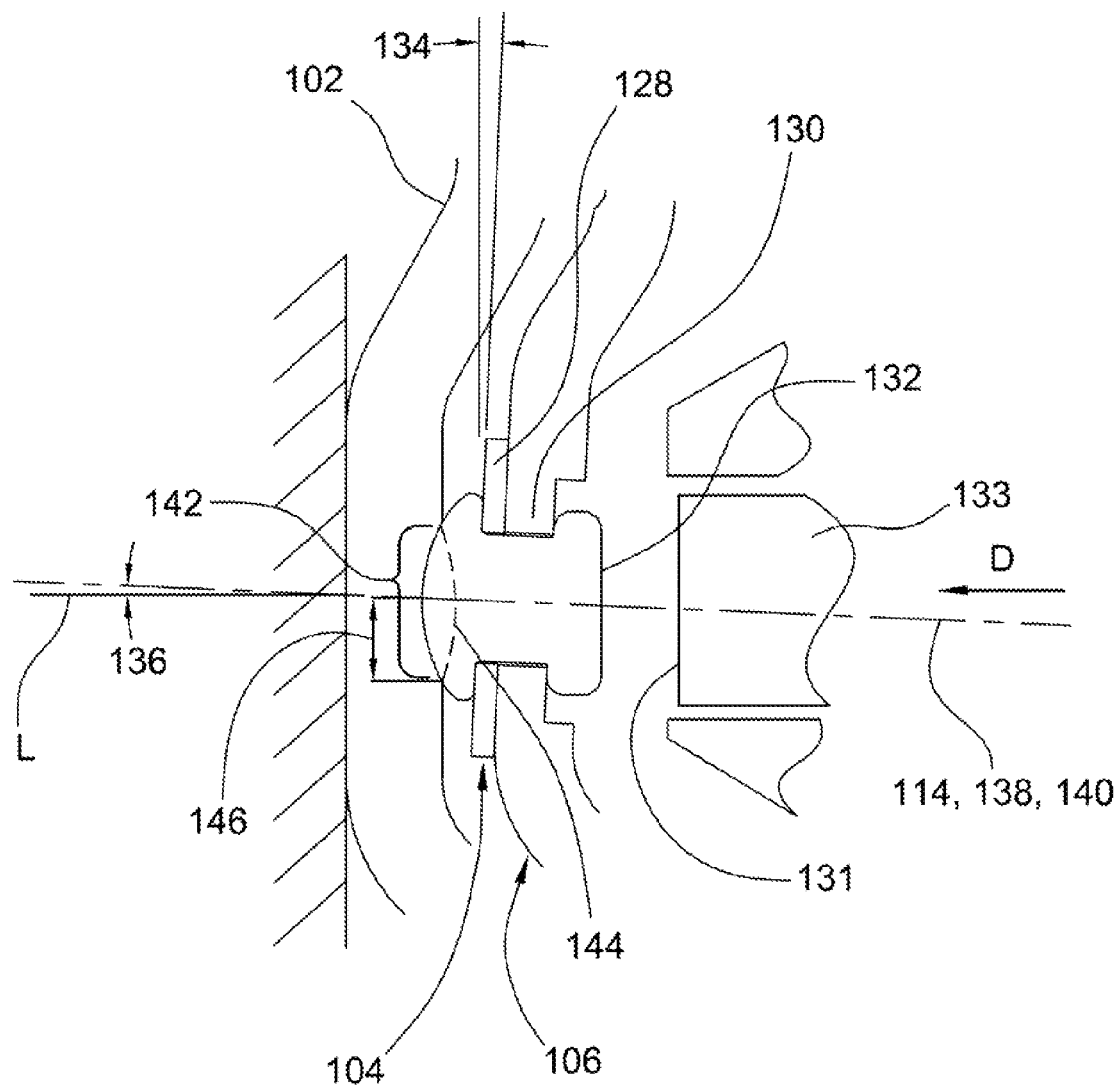

FIGS. 3A through 3C illustrate a method of connecting plates in a torque converter with a shaped rivet head and a shaped surface of a cover. Although the following method is described as a sequence, no order should be inferred unless explicitly stated. In one embodiment, torque converter 101 includes front cover 102, plates 104 and 106, and rivet 108 including body 110, head 112, and longitudinal axis 114 passing through the body and the head. A first step forms the head of the rivet such that end surface 116 of the head is curved or forms multiple planes. In FIGS. 3A through 3C, the end surface is curved. A second step forms portion 118 of interior surface 120 of the cover to protrude or indent with respect to surrounding portion 122 of the interior surface. In FIGS. 3A through 3C, the portion 118 is indented. A third step disposes the body of the rivet in holes 124 and 126 in portions 128 and 130 of plates 104 and 106, respectively, so that the end surface of the rivet head faces the front cover. The preceding steps are shown in FIG. 3A. Portion 122 does not protrude from remainder 120A of interior surface 120, for example as evidenced by the fact that the thickness of cover 102 is uniform except at the indent.

As shown in FIG. 3B, a fourth step displaces plates 104 and 106 such that the end surface of the rivet head contacts the portion of the interior surface, and portions 128 and 130 are at acute angle 134 with respect to the surrounding portion of the interior surface. Also, the longitudinal axis of the rivet is at acute angle 136 with respect to line L orthogonal to the surrounding portion of the interior surface. As shown in FIG. 3C, a fifth step applies force, for example, via end surface 131 of fixture 133, to end 132 of the rivet opposite the head of the rivet, to smash the rivet head.

In one embodiment, the respective holes include respective longitudinal axes 138 and 140 and disposing the body of the rivet in holes 124 and 126 includes aligning axes 138 and 140 and the longitudinal axis for the rivet. Applying force to displace the plates includes: sliding the rivet head along the portion of the interior surface and maintaining the alignment of the respective longitudinal axes and the longitudinal axis for the rivet. Thus, a gap, such as gap 32 noted above, is not formed between the rivet head and plate 104.

In one embodiment, applying force to displace the plates includes applying force in direction D orthogonal to the surrounding portion of the interior surface. In one embodiment, the end surface of the rivet head includes portion 142 wholly enclosed by circumferential line 144 (shown dashed) with respect to the longitudinal axis for the rivet. That is, portion 142 is wholly enclosed and wholly fills a circle with a radius 146 from the longitudinal axis for the rivet. Portion 142 contacts the portion of the interior surface. As further described infra, the respective shapes of surface 116 and portion 118 are complementary, maximizing the contact area between the rivet head and the cover and providing uniform contact across all or most of surface 116, while enabling the rivet to pivot without creating a gap, such as gap 32 noted above, between the rivet head and plate 104.

Figure 4:
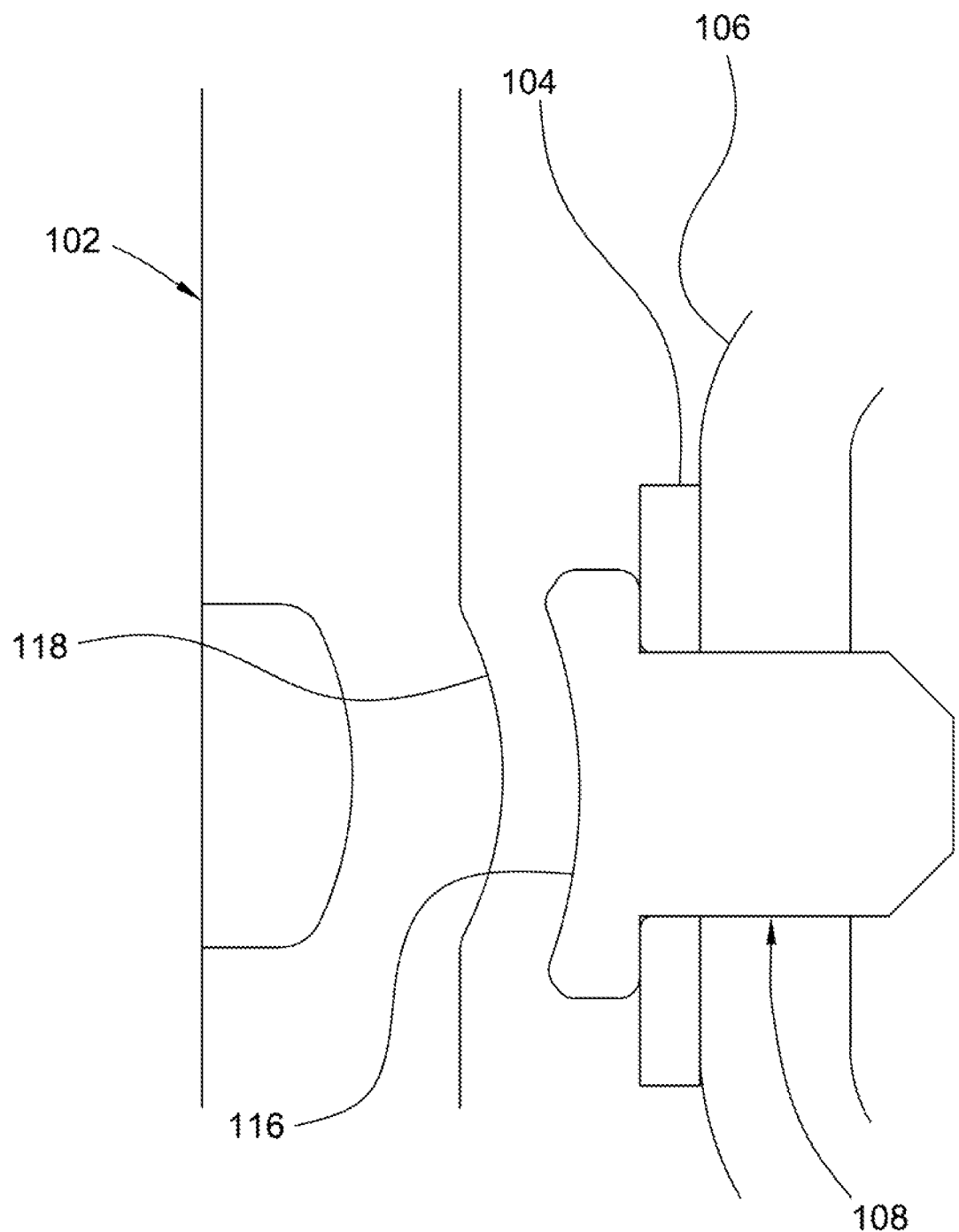
FIG. 4 shows the end surface of the head of the rivet indenting toward the body of the rivet, and portion of the interior surface of the cover protruding.

FIG. 4 shows the end surface of the head of the rivet indenting toward the body of the rivet, and portion 118 of the interior surface of the cover protruding from portion 122. The discussion regarding FIGS. 3A through 3C is applicable to the configuration shown in FIG. 4. Fixture 133 is not shown in FIG. 4.

Figure 5A:
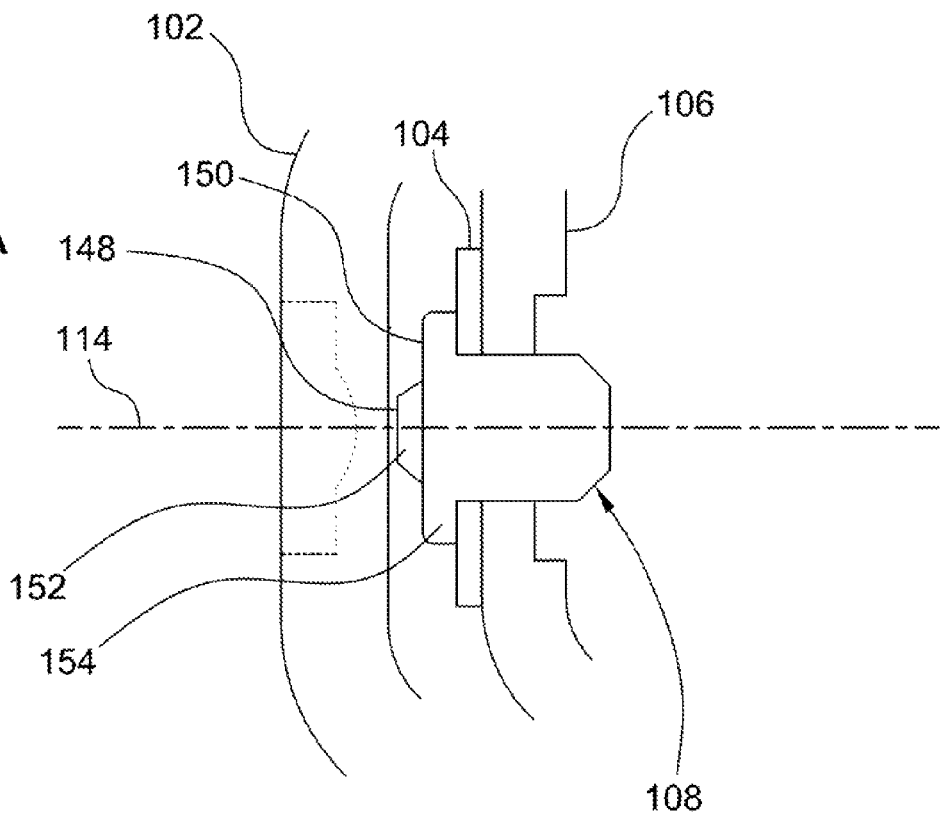
FIGS. 5A and 5B show the end surface of the rivet head formed with multiple planes.
Figure 5B:
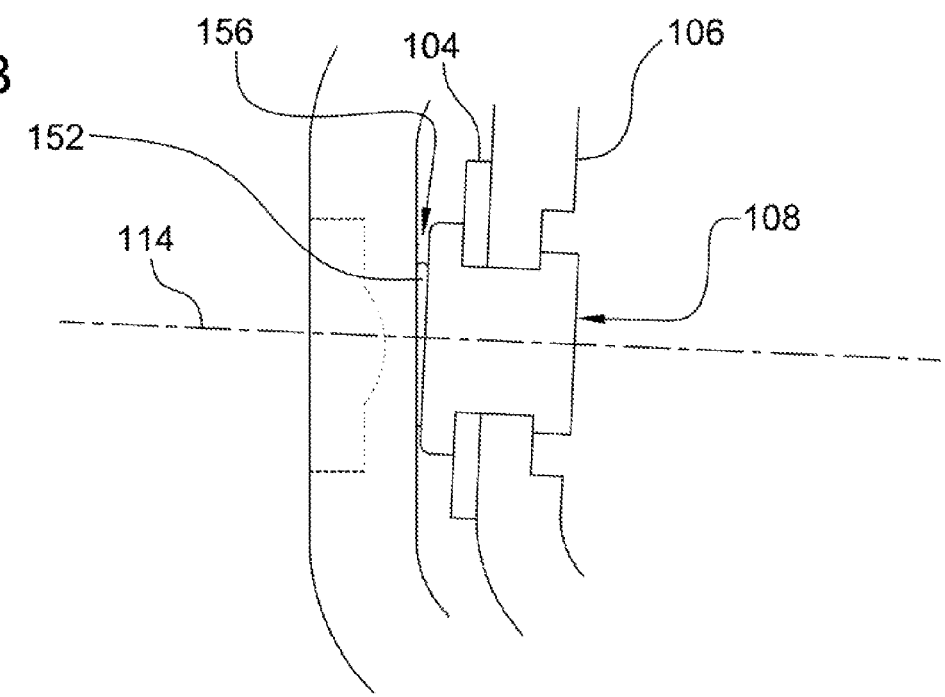

FIGS. 5A and 5B show the end surface of the rivet head formed with multiple planes, for example, planes 148 and 150. For example, portion 152 of the end surface of the rivet head protrudes from portion 154 of the end surface of the rivet head. In one embodiment, portion 152 is co-linear with the longitudinal axis of the rivet and portion 154 of the end surface is planar. The portion of the interior surface of the cover which the rivet head contacts is not protruding or indented. Instead, portion 152 is sized and located such that as force is applied to the rivet to compress the rivet in FIG. 5B, the material forming portion 152 flows to fill gap 156 between the cover and the rivet head so that the rivet head stays tight against plate 104 without gap 32 of the prior art. Fixture 133 is not shown in FIGS. 5A and 5B.

Figure 6A:
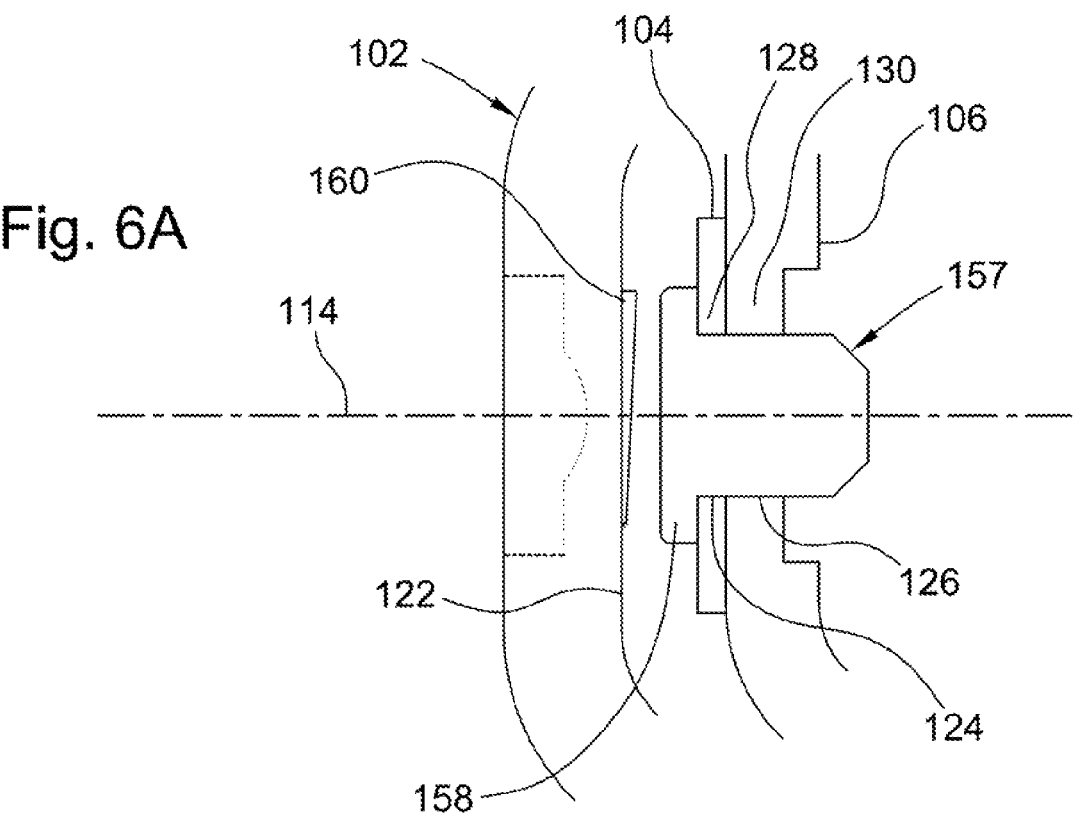
FIGS. 6A and 6B illustrate a method of connecting plates in a torque converter with a planar protrusion on a surface of a cover; and, FIG. 7 is a partial cross-sectional view of a torque converter including a shaped rivet head and shaped surface of a cover plate.
Figure 6B:
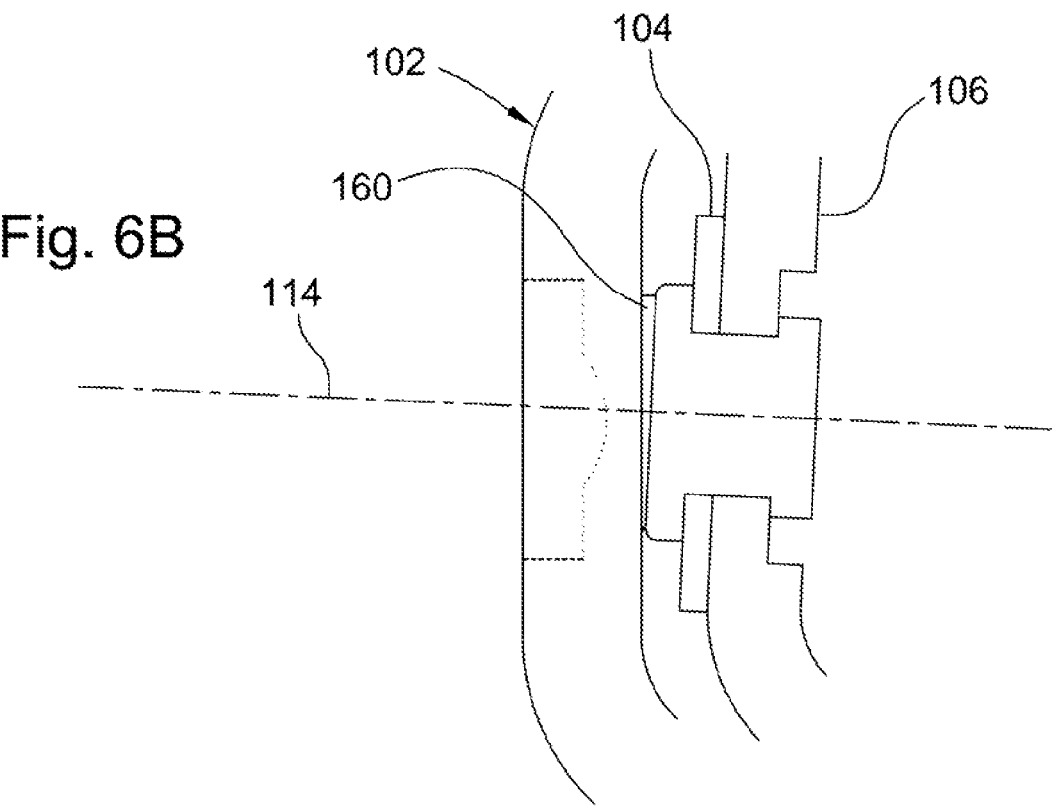

FIGS. 6A and 6B illustrate a method of connecting plates in a torque converter with a planar protrusion on a surface of a cover. Although the following method is described as a sequence, no order should be inferred unless explicitly stated. In one embodiment, the torque converter includes front cover 102, plates 104 and 106, and rivet 157 including body 110, head 158, and longitudinal axis 114 passing through the body and the head. A first step forms planar surface 160 protruding from surrounding portion 122 of the cover. A second step disposes the body of the rivet in holes 124 and 126 in portions 128 and 130 of plates 104 and 106, respectively, so that the end surface of the rivet head faces the front cover. The preceding steps are shown in FIG. 6A.

A third step bends plates 104 and 106 such that the end surface of the rivet head contacts the planar surface. A fourth step applies force to plates 104 and 106 such that the plates displace so that portions 128 and 130 are at acute angle 134 with respect to the surrounding portion of the interior surface, the end surface of the rivet contacts the planar surface, and the longitudinal axis of the rivet is orthogonal to the planar surface. Force is applied to the end of the rivet in direction D orthogonal to the surrounding portion of the interior surface. Fixture 133 is not shown in FIGS. 6A and 6B. The angle of surface 160 enables the rivet head to align with surface 160 without the necessity of pivoting or displacing within holes 124 and 126.

Thus, for FIGS. 3A through 6B, substantially all of the end surface of the rivet head is in mating engagement with the cover without creating a gap, such as gap 32 noted above, between the rivet head and plate 104. Thus, force applied to the rivet is more equally distributed across the rivet, counteracting the undesirable effects noted supra.

Returning to FIGS. 3A through 3C, assembly 170 for torque converter 101 includes cover 102, rivet 110, and plates 104 and 106 with respective portions 128 and 130. Plates 104 and 106 are deflectable to enable contact between portion 118 of the interior surface and the rivet head as pressure is applied to compress the rivet against the portion 118 to fix the rivet to plates 104 and 106. As the rivet is compressed plates 104 and 106 are at acute angle 134 with respect to portion 122 of the interior surface, and the longitudinal axis of the rivet is at acute angle 136 with respect to line L.

The discussions regarding FIGS. 4 through 6B are applicable to assembly 170. For example, as described for FIG. 4, the end surface of the rivet head can indent and the surface of the cover can protrude. For example, as described for FIGS. 5A and 5B, the end surface of the rivet head can be formed with multiple planes. For example, as described for FIGS. 6A and 6B, a planar surface can be formed on surface 120 of the cover.

The following provides further detail regarding the methods and assemblies described above. The methods and assemblies described above enable self alignment of rivet 110 during riveting operations and support rivet head 112 to achieve the desired rivet fill with improved durability, avoiding the problems noted supra. For example, undesirable plastic deformation of the rivet head while applying a stripping force and riveting force (applying force to end 132) is avoided, improving the riveting of plates, such as plates 104 and 106, not parallel to portion 122 of the cover plates or surface 131 of the fixture. For example, in some embodiments, as shown in FIGS. 3A through 4, the geometry of end surface 116 and portion 118 are designed with complementary curved or spherical shapes calculated to enable the rivet to self align with plates 104 and 106 (keep axes 114 and 138/140 aligned) while applying force with the fixture. The complementary shapes of surface 116 and portion 118 maximize support for the rivet during the riveting operation by greatly increasing the contact area between the rivet head and the cover.

Further, the complementary spherical surfaces of the rivet head and the cover enable rivet 110 to rotate, or slide along portion 118 during the riveting operation. For example, the rivet remains in the same position in holes 124 and 126 as surface 116 slides along portion 118. For example, in FIG. 3C, surface 116 slides upward as portions 128 and 130 are further displaced to the left, compensating for the radial and axial displacement of the rivet head and the resulting non-parallel configuration of portions 128 and 130 with respect to portion 122.

In one embodiment, the surface ratio between portion 118 and the geometry of the rivet head is calculated to allow for position tolerances and variation between portion 118 and the rivet head. When a stripping force is applied via the fixture, the rivet head deforms to elastically match the geometry of portion 118, increasing the contact area between the cover and the rivet head and advantageously reducing the contact stress between the cover and the rivet head. In one embodiment, the increased contact area decreases the unit loading on the rivet head with respect the rivet body during the coining, or deformation, of the rivet head, since the contact area between rivet head and portion 118 is calculated to be greater than a cross-sectional area of the body of the rivet. Thus, the methods and assemblies described supra enable riveting of non parallel plates without the deformation and damage noted supra, caused by improper and inadequate support of the rivet head. Thus, rivet fill and durability of the joint between the rivet and the plates are both improved.

Figure 7:
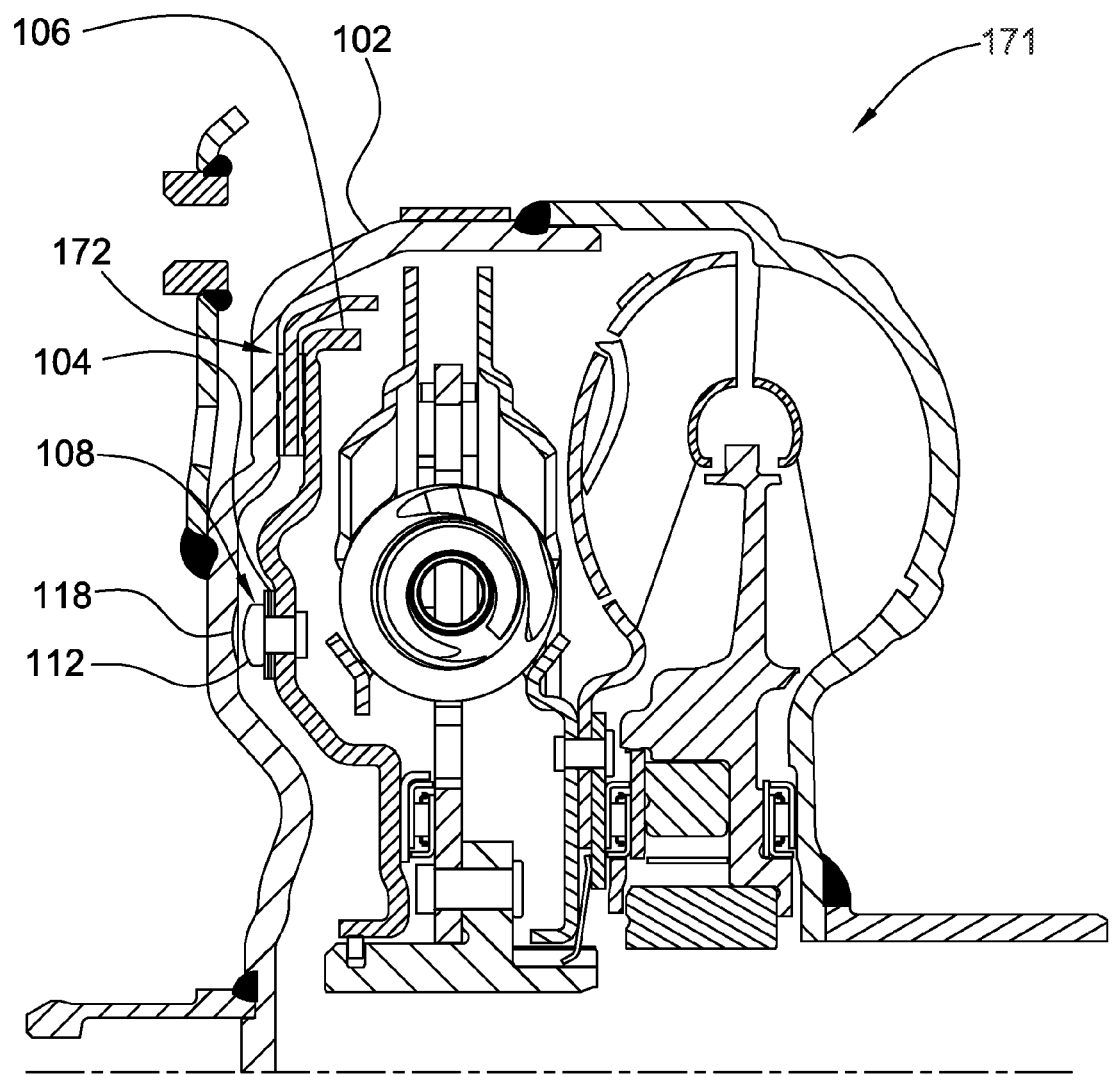

FIG. 7 is a partial cross-sectional view of torque converter 171 including a shaped rivet head and shaped surface of a cover plate. In torque converter 171, plate 106 is a piston plate for lock-up clutch 172, and multiple plates 104 are shown.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A method of connecting plates in a torque converter with a rivet, the torque converter including a front cover and first and second plates and the rivet including a body, a head, and a longitudinal axis passing through the body and the head, comprising:
    forming the head of the rivet:
        such that an end surface of the head forms a convex curve; or,
        such that an end surface of the head forms a concave curve; or,
        to include a first planar portion and an end surface of the head formed by a second portion protruding from the first portion;
    forming a first portion of an interior surface of the cover to:
        when the end surface of the head forms a convex curve, indent with respect to a surrounding portion of the interior surface; or,
        when the end surface of the head forms a concave curve, protrude with respect to a surrounding portion of the interior surface; or,
        when the end surface of the head includes the second portion protruding from the first portion, be planar with respect to a surrounding portion of the interior surface;
    when the first portion of the interior surface of the cover indents with respect to a surrounding portion of the interior surface, forming the surrounding portion of the interior surface so that the surrounding portion does not protrude from the interior surface;
    disposing the body of the rivet in respective holes in respective portions of the first and second plates such that the end surface of the rivet head faces the front cover;
    displacing the first and second plates such that:
        the end surface of the head forming a convex curve contacts the first portion of the interior surface indented with respect to the surrounding portion of the interior surface; or,
        the end surface of the head forming a concave curve contacts the first portion of the interior surface protruding with respect to the surrounding portion of the interior surface; or,
        the end surface formed by the second portion contacts the first portion of the interior surface planar with respect to the surrounding portion of the interior surface; and,
        displacing the first and second plates such that the respective portions of the first and second plates are at an acute angle with respect to the surrounding portion of the interior surface, and the longitudinal axis of the rivet is at an acute angle with respect to a line orthogonal to the surrounding portion of the interior surface.

2. The method of claim 1 wherein:
    the respective holes include respective longitudinal axes; and,
    disposing the body of the rivet in respective holes includes aligning the respective longitudinal axes and the longitudinal axis for the rivet, the method further comprising:
    sliding, while applying a force to the rivet in a direction toward the cover and parallel to the line orthogonal to the surrounding portion of the interior surface, the end surface of the head of the rivet along the portion of the interior surface.

3. The method of claim 1 wherein
    when the head of the rivet is formed such that the head of the rivet includes the first planar portion and the end surface formed by the second portion protruding from the first portion:
    the longitudinal axis passes through the end surface; and, the longitudinal axis does not pass through the first planar portion.

4. The method of claim 1 wherein:
    the end surface of the head of the rivet includes a portion wholly enclosed by a circumferential line with respect to the longitudinal axis for the rivet; and,
    the portion of the end surface contacts the portion of the interior surface.

5. A method of connecting plates in a torque converter with a rivet, the torque converter including a front cover and first and second plates and the rivet including a body, a head, and a longitudinal axis passing through the body and the head, comprising:
    protruding a planar surface from a surrounding portion of an interior surface of the cover so that the planar surface tapers radially inward with respect to the surrounding portion of the interior surface;
    disposing the body of the rivet in respective holes in respective portions of the first and second plates such that the end surface of the rivet head faces the front cover; and,
    bending the first and second plates such that the end surface of the rivet head contacts the planar surface, the respective portions of the first and second plates are at an acute angle with respect to the surrounding portion of the interior surface, and the longitudinal axis of the rivet is orthogonal to the planar surface.

6. The method of claim 5, wherein the rivet includes a longitude axis, the method further comprising:
    sliding, while applying a force to the rivet in a direction toward the cover and parallel to a line orthogonal to the surrounding portion of the interior surface, the end surface of the rivet head along the portion of the interior surface so that the longitudinal axis is at an acute angle with respect to the line orthogonal to the surrounding portion of the interior surface.

7. An assembly for a torque converter comprising:
    a front cover including an interior surface with a portion:
        indented with respect to a surrounding portion of the interior surface; or,
        protruding with respect to a surrounding portion of the interior surface; or,
        planar with respect to a surrounding portion of the interior surface;
    first and second plates including respective portions with respective holes; and,
    a rivet including a body, a head, and a longitudinal axis passing through the body, wherein:
    the head includes:
        an end surface forming a convex curve when the interior surface includes the portion of the interior surface indented with respect to the surrounding portion of the interior surface; or,
        an end surface forming a concave curve when the interior surface includes the portion of the interior surface protruding with respect to the surrounding portion of the interior surface; or,
        a first planar portion and an end surface of the head formed by a second portion protruding from the first portion when the interior surface includes the portion of the interior surface planar with respect to the surrounding portion of the interior surface, wherein:
    the body is disposed in the respective holes;
    the first and second plates are deflectable to enable contact between the portion of the interior surface and the end surface of the head of the rivet as pressure is applied to compress the rivet against the portion of the interior surface to fix the rivet to the first and second plates; and, wherein:

when the portion of the interior surface of the cover is indented, the surrounding portion of the interior surface does not protrude from the interior surface; and, as the rivet is compressed:

the first and second plates are at an acute angle with respect to the surrounding portion of the interior surface; and, the longitudinal axis of the rivet is at an acute angle with respect to a line orthogonal to the surrounding portion of the interior surface.

8. The assembly of claim 7 wherein the first portion of the end surface is co-linear with the longitudinal axis.

9. An assembly for a torque converter comprising:

a cover for driving engagement with a prime mover, the cover including a planar surface protruding from a surrounding portion of the interior surface so that the planar surface tapers radially inward with respect to the surrounding portion of the interior surface;

first and second plates including respective portions with respective holes; and, a rivet including a body, a head, and a longitudinal axis passing through the body and the head, wherein:

the body is disposed in the respective holes; and, the first and second plates are deflectable to enable contact between the planar surface and the rivet head as pressure is applied to fix the rivet to the first and second plates.

10. The assembly of claim 9, wherein the pressure is applied to the rivet in a direction orthogonal to the surrounding portion of the interior surface.

11. The assembly of claim 10 wherein:

the rivet includes a longitudinal axis passing through the body and the head; and, the first and second plates are deflectable such that the longitudinal axis is orthogonal to the planar surface.

* * * * *